United States Patent Office 3,579,680
Patented May 25, 1971

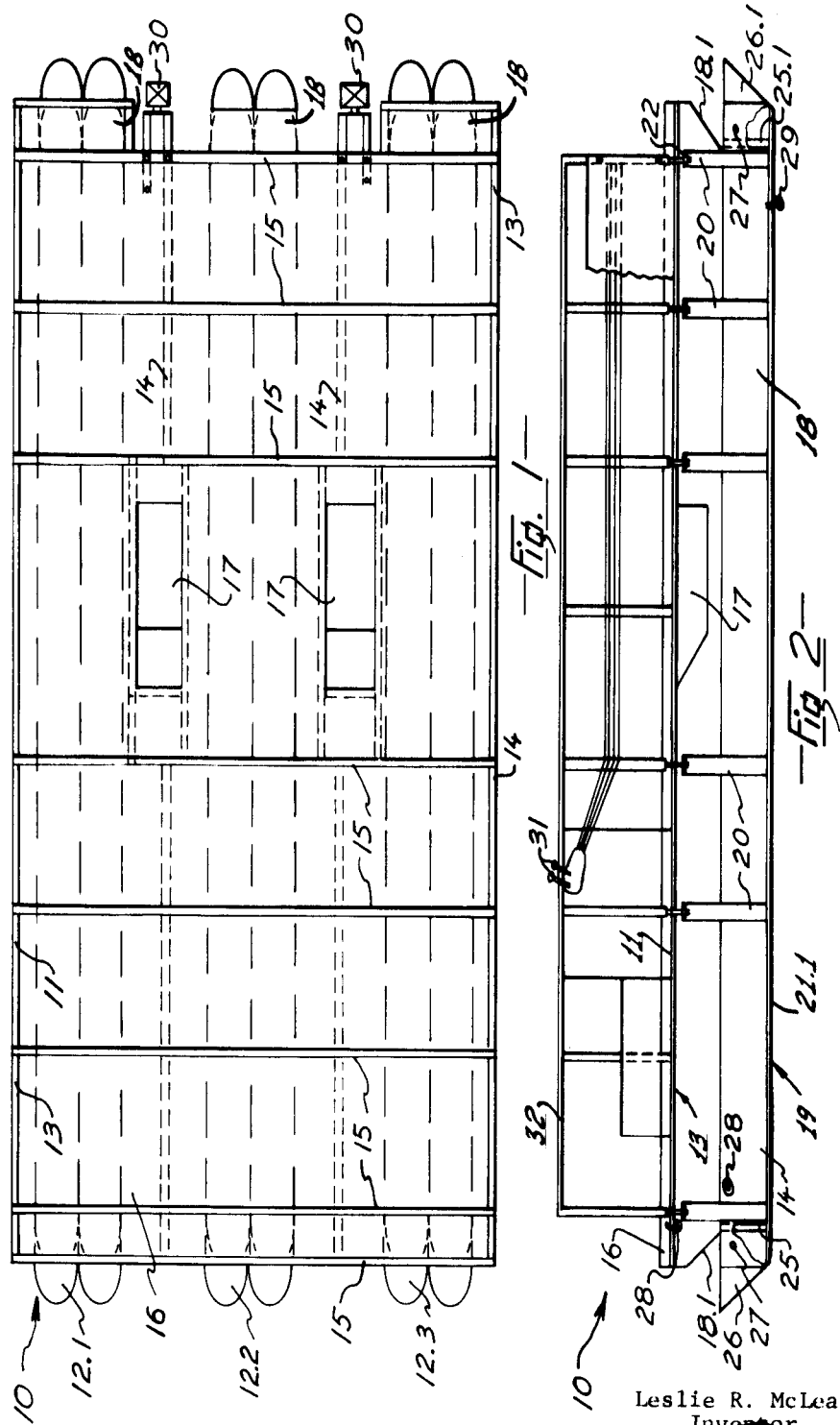

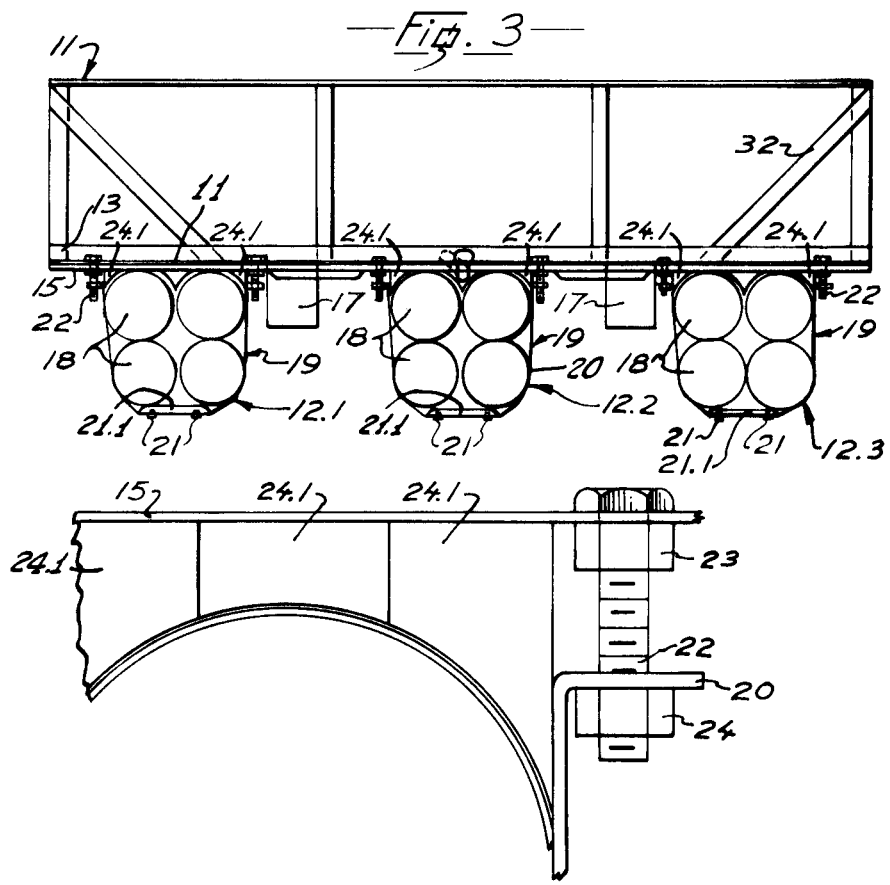

3,579,680
MOTORIZED FLOAT
Leslie R. McLean, Box 414, 414 Strathconia Ave.,
Kelowna, British Columbia, Canada
Filed Mar. 3, 1969, Ser. No. 803,732
Int. Cl. B63b 35/00; B63c
U.S. Cl. 9—1                                    3 Claims

ABSTRACT OF THE DISCLOSURE

A motorized float for supporting house trailers having a trailer-supporting deck structure supported by a plurality of elongated fore and aft flotation units, each of the latter being formed of at least three pontoons which are arranged in a tight, compact bundle by straps extended therearound and connected to the deck structure. A protective member connected to the straps extends longitudinally of and beneath each bundle of pontoons.

BACKGROUND OF THE INVENTION

This invention relates to motorized barges or floats and in particular to motorized barges and floats are carrying house trailers and the like.

In the field of pleasure boating, water craft of the nature of house boats have proven most successful for comfortable living on the water. This has led to the development of motorized floats upon which house trailers and campers may be loaded. Motorized floats of present design, however, are not eminently suitable for use by novices who may own or rent a trailer and who may wish to load the trailer on a motorized float for a short vacation.

Motorized barges or floats, particularly of the pontoon type, for this purpose must be of relatively light construction in order to avoid heavy power requirements for pushing them through the water. They must also be capable of being constructed at a relatively small cost so that rental costs to the users may be kept to a minimum. Furthermore, as the users are generally not experienced sailors, the motorized float for carrying the user's trailer must be constructed so as to practically eliminate danger of damage to pontoons when they are beached. The pontoons must also be so fashioned that if damage occurs to one or more of them the craft will still remain afloat. Motorized floats of this nature, or prior design, have not been entirely successful, by reason of the design of the pontoons or flotation units. Such pontoons of prior design have been relatively expensive to construct, and in order to achieve lightness are normally easily damaged. Furthermore, once damaged they are relatively difficult to repair, and normally require the motorized float to be laid up for a considerable time in order that repairs may be properly effected.

SUMMARY OF THE INVENTION

The present invention provides a motorized float which is constructed of easily obtainable, low cost materials, yet which when assemblied is strong enough to adequately carry a house trailer.

The present invention furthermore provides a motorized float having flotation units which are arranged so as to minimize damage caused by inexperienced sailors, particularly due to grounding and the like.

The float of the present invention, furthermore, is so constructed that the flotation units, if damaged, may be easily and quickly replaced so as to minimize time loss during repairs.

The motorized float of the present invention includes a rigid deck structure, a plurality of fore and aft extending elongated flotation units connected to the deck structure for supporting the latter clear of the surface of the water. Each of the said flotation units includes a bundle of at least three elongated pontoons arranged so that at least two of them extend in a side-by-side relationship in direct supporting engagement with the deck structure and support at least another pontoon in spaced relationship to and below the deck structure. A harness extends about each bundle of pontoons for securing said flotation unit against movement relative to the deck structure. The motorized float of the present invention also includes wooden buffers below and at the front and rear of each flotation unit to protect the pontoons thereof from damage.

BRIEF DESCRIPTION OF THE DRAWINGS

FIG. 1 is a plan view of the motorized float.
FIG. 2 is a side view thereof.
FIG. 3 is an end view thereof.
FIG. 4 is an enlarged end view of a portion of the motorized float illustrating the manner of supporting one pontoon.

DESCRIPTION OF PREFERRED EMBODIMENT

Referring to the drawings, and in particular to FIGS. 1, 2 and 3 thereof, the motorized float, generally accorded the numeral 10, includes a deck structure 11, supported by a plurality (three being illustrated) of flotation units 12.1, 12.2, 12.3.

The deck structure includes a frame 13 of rectangular configuration having longitudinal structural members 14 and a transverse structural member 15 suitably interconnected as by bolting or riveting. The structural members are angle section so as to form a relatively stiff but light frame. The frame 13 is covered with a light deck 16 which can be sheets of ¾ inch plywood. The decking, of course, is secured to the structural members by bolting thereto.

The deck structure 11 also includes wheel wells 17 which are formed of a material such as a heavy galvanized steel. The wheel wells are spaced a distance apart sufficient to accept the wheels of a trailer or the like and are suitably secured by bolting or the like to suitably positioned longitudinal and transverse structural members.

The flotation units are each formed of a bundle of individual elongated pontoons 18. These pontoons are lengths of aluminum piping, the type used for irrigation work being suitable. With specific reference to flotation unit 12.3 which is representative of all three units, it will be seen, FIG. 3, that four pontoons or pipes are used which are arranged in horizontal and vertical pairs and are strapped as a compact bundle to the transverse structural members 15 of the frame 13 by a form of harness 19. Flotation units can also be formed of three pipes arranged with two of them extending in side-by-side relationship against the underside of the float with another nesting in between. This latter configuration is not illustrated. The harness 19 takes the form of a plurality of straps 20, of galvanized sheet steel, which are extended around the bundle of pontoons at each of the transverse structural members. These straps 20 extend about and are secured as by nails 21 to an elongated buffer such as a wooden plank 21.1 which extends longitudinally of and beneath the two lowermost pontoons. The opposite ends of the straps 20 are apertured to receive the shanks 22 of bolts 23 which extend downwardly from said transverse structural members. Nuts 24 threaded over the bolts permit the straps 20 to be tightened so that the bundle of pontoons is relatively compact and unmovable. Wooden chocks 24.1, see FIGS. 3 and 4 shaped to fit the pontoons are also bolted to the transverse members 15 on opposite sides of the two uppermost pontoons so as to prevent lateral movement of the latter relative to the deck structure.

The uppermost two pontoons 18 of each of the flotation units are closed at their ends by plates 18.1 welded thereover so as to be absolutely water-tight. The lowermost two pontoons of each of the flotation units are closed at their fore and aft ends by internal bulkheads 25 and 25.1 and wooden plugs 26 and 26.1, respectively, said plugs extending beyond the ends of said lowermost pontoons and are secured firmly in position by lag screws 27. These plugs, preferably the bow plugs, are shaped so as to have a decided rake. This permits the float to move through the water much more easily than if the plugs offered a broad, flat front.

Both the upper and lower pair of pontoons, FIG. 2, are fitted with filler valves 28, to permit the pontoons to be pressurized slightly above atmospheric pressure. Spring closed relief valves 29 are also provided for each pontoon, being located near the bottom of the latter. These latter valves are arranged so that they will open at a predetermined air pressure in the pontoons.

The float 10 includes a pair of aft brackets 30, FIG. 1, to which a pair of marine outboard motors, not shown, may be secured. Controls 31, FIG. 2, positioned at the front of or at the side of the float, are arranged to be connected to the motors in a conventional manner, the controls being such as to obtain directional as well as speed control of the float. The float is also provided with a peripheral fence 32 which can be formed of any suitable material and connected to the longitudinal and transverse members in any suitable fashion. One side of the fence, preferably at the fore end of the float, is removable to permit a trailer or the like to be loaded thereon.

In the operation and use of the motorized floats, a house trailer or the like is loaded onto the deck and its wheels located in the wells 17. The trailer is then suitably tied down and jacked so that it is immovable relative to the float. The removable portion of the fence is then reconnected so as to form a complete enclosure about the house trailer.

The float, carrying the house trailer, may be steered with the control cables. However, it will be appreciated that the directional control of the motors can easily be achieved by the employment of conventional electrically operated devices which can be connected into the electrical system with which most house trailers are equipped, so as to permit directional control of the craft from inside the trailer.

In the design of the flotation units, the size relationship between the pontoons and the entire float when loaded is important. Pontoons of a sufficient size are chosen so that with the float completely loaded the lowermost pairs of pontoons of all units, only, will be submerged. This will, therefore, insure that if a pair of pontoons, say a pair of lower pontoons on the right side were to be damaged, buoyancy sufficient for flotation would be insured by the provision of the two uppermost pontoons of the right flotation unit.

It is to be appreciated also that under reasonable conditions, the pontoons will not likely be damaged to any extent. The underside of each flotation unit is protected by the plank 21.1 whereas the noses and ends of the pontoons are protected by the plugs 26 and 26.1.

From time to time, it will be appreciated that leakage, in a small amount, might occur in each pontoon. It is, therefore, necessary that occasionally each pontoon be pressurized above the release pressure of the relief valves. When this is done, any water lying in any pontoon will be forced out of the relief valves so that full buoyancy of the pontoons may be maintained.

The simplified structure of the flotation units permits easy repair if damage does occur. All that is necessary to do is loosen the straps until the bundle of pontoons is in a relatively loose condition, slide out the damaged pontoon and then replace it with another pontoon, after which the straps may be retightened so that the bundle is in a compact condition.

It will be realized that the strength of the deck is not achieved through the structural members themselves, but through the support obtained from the use of cylindrical pipe as pontoons. Each flotation unit has sufficient internal strength to stand normal bending stresses and, therefore, serve in the nature of strengthening means for the deck structure. The deck structure, however, is light enough to flex sufficiently to permit minimal movement of the pontoons.

I claim:
1. A motorized float including:
   (a) a rigid deck structure,
   (b) a plurality of fore and aft extending flotation units connected to the structure for supporting the latter above a water surface, each unit including a bundle of at least three pontoons arranged so that two of the pontoons extend in side by side relationship against an under side of the deck structure and at least one pontoon extends below said two pontoons,
   (c) a wooden buffer extending below and from end to end of each bundle of pontoons;
   (d) straps extending transversely around each buffer and bundle of pontoons, the straps having apertured free ends of the straps and the rigid deck structure for adjusting tension of the straps about each bundle of pontoons.
2. A motorized float as claimed in claim 1 including:
   (e) chocks secured to deck structure on opposite sides of said two pontoons for preventing relative lateral movement of the bundles of pontoons.
3. A motorized float as claimed in claim 1 in which each pontoon is a length of cylindrical pipe closed at opposite ends, the lowermost of the pipes in each bundle having wooden protective plugs at each end.

References Cited

UNITED STATES PATENTS

| | | | |
|---|---|---|---|
| 659,883 | 10/1900 | Webster | 9—11(.1) |
| 1,019,224 | 3/1912 | Clark | 114—0.5(F)UX |
| 1,667,912 | 5/1928 | Vlahon | 9—11 |

TRYGVE M. BLIX, Primary Examiner

U.S. Cl. X.R.

114—0.5